United States Patent [19]

Bodesheim et al.

[11] 3,755,263
[45] Aug. 28, 1973

[54] DISULFIMIDE ACID-MODIFIED HIGH MOLECULAR WEIGHT POLYAMIDES

[75] Inventors: Ferdinand Bodesheim; Gerhard Dieter Wolf; Gunther Nischk, all of Dormagen, Germany

[73] Assignee: Bayer Aktiengesellschaft, Leverkusen, Germany

[22] Filed: Apr. 9, 1971

[21] Appl. No.: 132,871

[30] Foreign Application Priority Data
Apr. 15, 1970 Germany............... P 20 17 968.4

[52] U.S. Cl.......... 260/78 R, 260/2.1 C, 260/33.4 P, 260/78 A, 260/78 L
[51] Int. Cl.............................................. C08g 20/20
[58] Field of Search............... 260/78 R, 78 A, 78 L, 260/78 SC

[56] References Cited
UNITED STATES PATENTS 3,184,436  5/1965  Magat.............................. 260/78 R
3,296,204  1/1967  Caldwell........................... 260/78 R Primary Examiner—Harold D. Anderson
Attorney—Plumley & Tyner

[57] ABSTRACT

High molecular weight aliphatic polyamides containing at least 50 mequiv. per kg of polyamide of units of the formula

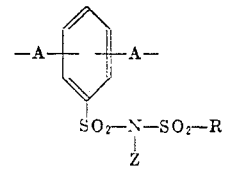

The polyamides are useful for the production of filaments and films and show great affinity for basic dyes.

11 Claims, No Drawings

DISULFIMIDE ACID-MODIFIED HIGH MOLECULAR WEIGHT POLYAMIDES

This invention relates to linear high molecular weight polyamides having disulphimide groups in a side chain to promote dyeability with basic dyes, and to a process for their production.

According to Belgian Patent Specification No. 716,008, polyamides with a high affinity for basic dyes are obtained by co-condensing compounds corresponding to the general formula:

$$X-R-SO_2-N-SO_2-R-X$$
$$|$$
$$M$$

during the formation of polyamides. In this formula, each symbol

X represents a group which is capable of forming a carbonamide function under the condensation conditions, R represents an aromatic radical, whilst M represents a metal ion.

The acid disulphimide group, $-SO_2-NH-SO_2-$, which imparts dyeability, actually forms part of the polyamide chain.

It is also possible to incorporate, in aromatic polyamides, compounds which contain the disulphimide structure in a side chain, by polycondensation in solution.

It is an object of this invention to provide new high molecular weight polyamides which have great affinity for basic dyes and which at the same time have outstanding physical properties.

This object is accomplished by a linear high molecular weight aliphatic polyamide containing in 1,000 g of polymide at least 50 mequiv. of units having the formula:

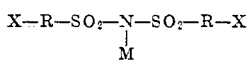

in which

Z represents a hydrogen or an alkali metal atom,

R represents a monovalent aliphatic, cycloaliphatic or aromatic radical, and each symbol Q represents an amide group of the formula $-NH-CO-$ or $-CO-NH$, said polyamide having a relative solution viscosity $\eta_{rel}$ of from 1.2 to 4.5 (as measured on a solution of 1 g of polyamide in 100 ml of m-cresol at 25° C).

The polyamides according to the invention are obtained by condensing a disulphimide of the general formula:

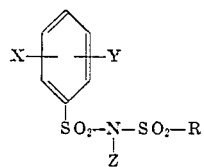

in which

X and Y represent groups capable of forming carbonamide groups under the condensation conditions, and are situated in the m- or p-position relative to one another, R and Z have the meaning as given above, together with a quantity sufficient for polyamide formation, preferably an equivalent quantity, of a bifunctional compound or by adding them to other polyamide-forming substances in such a quantity that the resulting polymer contains at least 50 mequiv. of acid disulphimide groups per 1,000 g of polyamide.

The symbols X and Y represent two functions, in the m- or p-position relative to one another in the aromatic nucleus, which are capable of forming a carbonamide group under the condensation conditions. Examples of such functional groups include amino, carboxylic acid, carboxylic acid ester or carboxylic acid chloride groups. X and Y can be the same or different.

It was extremely surprising that the aforementioned disulphimide compounds could be melt-condensed without any difficulty and that the polyamides obtained showed outstanding physical properties. The polyamides according to the invention show a distinctly improved affinity for dyes in comparison with the acid-modified polyamides of Belgian Patent Specification No. 716,008.

The following compounds are examples of disulphimide compounds corresponding to the above general formula which can be used according to the invention:

3,5-dicarboxy diphenyl disulphimide (1)
3,5-dicarbethoxyphenyl methyl disulphimide (2)
2,5-dicarbomethoxyphenyl methyl disulphimide (3)
3,5-diaminodiphenyl disulphimide (4).

It is preferred to use compounds that are derived formally from isophthalic acid-5-sulphonamide, i.e. that corresponding to substances Nos. (1) and (2).

Although the claimed disulphimides are primarily suitable for the condensation of polyamides in the melt, condensation with dicarboxylic acid halides at an interface or in solution is also possible. Compound No. (4) is for example, suitable for this purpose.

The disulphimides can be prepared, for example, by reacting the corresponding sulphonamides with sulphochlorides in an alkaline medium. To prepare acid-modified polyamides, the acid NH group of the disulphimide is advantageously converted into an alkali metal salt. For polycondensation, the salt is added to the polyamide-forming substance, together with a preferably equivalent quantity of a diamine or dicarboxylic acid, based on the condensible groups of the disulphimide, before the beginning of condensation, after which thermal condensation or polymerisation is carried out in known manner at an elevated temperature in an inert gas atmosphere.

The quantity in which the disulphimide is used is not critical and, depending upon the application envisaged, can amount to from 50 to 2,000 mequiv. of acid disulphimide groups per kg of polymer material, although the quantity in which the disulphimide is added is preferably such that the resulting polymer contains from 50 to 1,500 mequiv. of disulphimide per kg. In some special instances (for example whn using the monopotassium salt of (1) and hexamethylene diamine), it is possible to obtain homopolyamides which can then optionally contain more than 2,000 mequiv. of acid groups.

According to the invention, the disulphimides can be co-condensed with any compounds that are able to form polyamides thermally in the melt. Examples of such compounds include lactams, such as caprolactam or dodecalactam, aminocarboxylic acids such as ε-aminocaproic acid or ω-aminoundecanoic acid, and the salts of diamines such as hexamethylene diamine, octamethylene diamine or decamethylene diamine, with dicarboxylic acids, such as adipic acid, suberic acid or sebacic acid.

When they contain from 50 to about 250 mequiv. of acid groups per kg of polymer material, the polyamides thus produced are suitable for use in the production of filaments, fibres, films and mouldings with an outstanding affinity for basic dyes. Polymers with a higher acid group content are suitable, for example, for the production of master batches in the production of polyamides dyeable with basic dyes or, after they have been crosslinked with formaldehyde for example, as ion exchangers.

The following examples are to further illustrate the invention without limiting it.

The relative viscosities $\eta_{rel}$ quoted in the following Examples were measured on solutions of 1 g of polyamide in 100 ml of m-cresol at 25° C. All parts are by weight unless otherwise indicated.

EXAMPLE 1

26.1 Parts of the sodium salt of 3,5-dicarbomethoxy diphenyl disulphimide and 7.0 parts of hexamethylene diamine are introduced at 120° C into a melt of 4,000 parts of caprolactam and 67 parts of ε-aminocaproic acid. The mixture is then heated for 1 hour at 270° C under nitrogen, and condensed at this temperature for a period of 5 hours. The resulting polamide, which has a melting point of from 204 to 206° C and an $\eta_{rel}$ of 2.55, can be melt-spun after extraction with water in the usual way to form filaments and shows an outstanding affinity for basic dyes.

EXAMPLE 2

100.6 Parts of the lithium salt of 3,5-dicarbomethoxy diphenyl disulphimide, 27,8 parts of hexamethylene diamine, 50 parts of caprolactam and 30 parts of aminocaproic acid are combined and condensed under nitrogen for 7 hours at 280° C. An almost colourless copolyamide with a melting point of 168° C and an $\eta_{rel}$ of 1.65 is obtained.

EXAMPLE 3

451 Parts of the potassium salt of 3,5-dicarbomethoxy diphenyl disulphimide and 116 parts of hexamethylene diamine are condensed under nitrogen for 8 hours at 205° C. The polyamide thus obtained melts at 205° C and has a relative viscosity of 1.72.

EXAMPLE 4

116 Parts of hexamethylene diamine, 385 parts of 3,5-dicarbethoxyphenyl methyl disulphimide and 500 parts of caprolactam are condensed under nitrogen for 7.5 hours. A yellowish slightly brittle copolyamide with a melting point of 186° C and an $\eta_{rel}$ value of 1.59 is obtained.

What we claim is:

1. A linear high molecular weight aliphatic polycarbonamide containing in 1,000g of polycarbonamide at least 50 milliequivalents of units having the formula

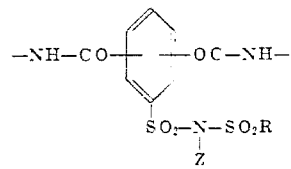

in which Z is hydrogen or an alkali metal atom;
R is a monovalent aliphatic, cycloaliphatic or aromatic hydrocarbon radical;
said polycarbonamide having a relative solution viscosity $\eta_{rel}$ of from 1.2 to 4.5 measured on a solution of 1 g of polycarbonamide in 100 ml of m-cresol at 25°C.

2. The polycarbonamide of claim 1 in which said units have the formula

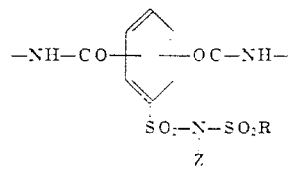

3. The polycarbonamide of claim 1 in which said units have the formula

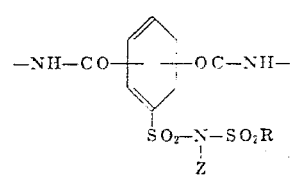

4. The polycarbonamide of claim 1 containing from 50 to 2,000 milliequivalents of said units per kg of polycarbonamide.

5. The polyacarbonamide of claim 1 which contains from 50 to 1,500 milliequivalents of said units per kg of polycarbonamide.

6. The polycarbonamide of claim 1 which contains from 50 to 250 milliequivalents of said units per kg of polycarbonamide.

7. The polycarbonamide of claim 1 in which R is an alkyl or aromatic hydrocarbon radical.

8. The polycarbonamide of claim 1 in which R is methyl or phenyl.

9. The polycarbonamide of claim 1 in which R is methyl.

10. The polycarbonamide of claim 1 in which R is phenyl.

11. The polcarbonamide of claim 2 in which R is phenyl or methyl.

* * * * *

UNITED STATES PATENT OFFICE
CERTIFICATE OF CORRECTION

Patent No. 3,755,263  Dated August 28, 1973

Inventor(s) Ferdinand Bodesheim; Gerhard Dieter Wolf; Gunther Nischk

It is certified that error appears in the above-identified patent and that said Letters Patent are hereby corrected as shown below:

In The Abstract, Line 2      "unets" should be ---units---

Column 2, Line 64      "whn" should read ---when---

Column 4, Claim 2, in the formula  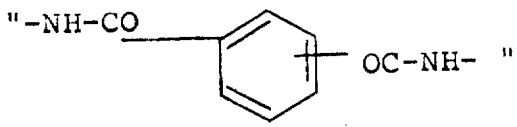

should be

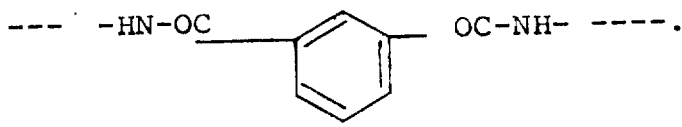

Column 4, Claim 3, in the formula, 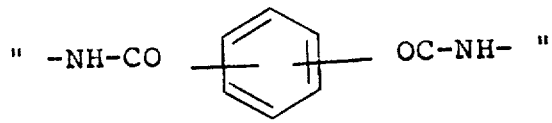

should read 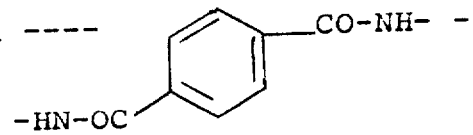

Column 4, Claim 5, Line 48,      "polyacarbonamide" should read ---polycarbonamide---.

Signed and sealed this 4th day of February 1975.

(SEAL)
Attest:

McCOY M. GIBSON JR.
Attesting Officer

C. MARSHALL DANN
Commissioner of Patents